United States Patent Office 3,423,467
Patented Jan. 21, 1969

3,423,467
STABLE AQUEOUS FORMALDEHYDE SOLUTIONS AND A PROCESS FOR PREPARING THEM
Ibrahim Dakli, Busto Arsizio, Nazareno Lupi, Castellanza, and Marcello Morini, Legnano, Italy, assignors to Montecatini Edison S.p.A., Milan, Italy
No Drawing. Continuation-in-part of application Ser. No. 231,034, Oct. 16, 1962. This application Oct. 27, 1964, Ser. No. 406,897
U.S. Cl. 260—606                                       6 Claims
Int. Cl. C07c 47/02

This is a continuation-in-part of our application Ser. No. 231,034 filed Oct. 16, 1962, now abandoned.

Our invention relates to stable aqueous formaldehyde solutions which can be used in all cases in which the unstabilized aqueous formaldehyde solutions are used, and further relates to a process for preparing said solutions.

The non-stabilized aqueous formaldehyde solutions, with time, become turbid and the separation of polymeric compounds then takes place.

This phenomenon is relatively slow in an acid or neutral medium but has a high rate in an alkaline medium.

A practically effective stabilization of aqueous formaldehyde solutions is therefore meaningful only at acid or neutral pH values; with alkaline pH values the stabilization in general means the regulation or decrease in the growing rate of the polymeric products.

The formaldehyde solutions coming from the production plants, even if they are deionized by means of ion-exchangers, are weakly acid due to the presence of formic acid; they can therefore be stabilized directly according to the present invention.

The formaldehyde solutions in general contain also small amounts of methanol (coming from the synthesis of formaldehyde from methanol or from hydrocarbons); at the limit when the methanol content is $\leq 1\%$ they are conventionally considered as "methanol free."

In the stabilization of formaldehyde solutions one cannot leave out consideration these low methanol amounts which are always present in the solutions and have a stabilizing action even though it is very low and of no interest for practical purposes.

In any case the present invention may be realized with formaldehyde solution absolutely free of methanol.

After this consideration it should be stressed that the parameters which regulate the separation of polymeric compounds from the unstabilized formaldehyde solutions essentially are:

The concentration of formaldehyde in the solution
The storage temperature
The storage time The influence of these parameters is reported in the literature; for example Walker in "Formaldehyde," Reinhold, 1953, Table 28, page 96 and Table 31, page 100 reports the temperature below which the polymers precipitate from the solution, as a function of the formaldehyde concentration of the solutions.

| $CH_2O$ concentration of the solutions, percent by weight: | Temperatures below which the polymer precipitates, ° C. |
|---|---|
| 40 | About 35 |
| 50 | About 50 |
| 58 | 62–64 |
| 66 | 72–74 |
| 72 | 84–86 |
| 84 | About 107 |
| 90 | About 116 |

The storage temperature influences the storage time of the solutions as can be observed from the following data reported by Walker (ibidem, page 75) for a 37% formaldehyde solution having a low methanol content:

| Storage temperature, ° C.: | Time during which no polymer precipitation occurs, days |
|---|---|
| 21 | 1 |
| 27 | 25 |
| 32 | 60 |

A more concentrated solution, e.g., a 50% solution, can remain clear for 25 days only if it is kept at 55° C.

It appears therefore that the measure of stabilization of the formaldehyde solutions can manifest itself in three ways:

Decrease in the storage temperature
Increase in the concentration of formaldehyde in the stored solutions
Increase in the storage time.

Since it is in general known that a formaldehyde solution with a concentration C is stable for a time $\tau$ at a temperature T, a substance is considered to be a stabilizer if it modifies in a favorable manner, one of these three parameters.

The stabilizing action in the above sense, in general, is a function of the amount of stabilizer. On the other hand, the lower the stabilizer amount necessary for obtaining the same stabilizing effect, the more effective is the stabilizer and the higher its amounts which can be added without limiting the possible uses of the solutions, the more appreciated is the stabilizer. For this reason and for different purposes both the high and the low concentrations of stabilizers claimed in our application can be of interest.

It is known that the stability of the formaldehyde solutions can be modified by addition of stabilizers such as methanol.

Again according to Walker (ibidem, page 77) a 37% formaldehyde solution is stable at different temperatures for 10–12 days depending on the methanol content, as appears in the following table:

| Methanol content of the solution, percent: | Storage temperature, ° C. |
|---|---|
| 2 | 29 |
| 6 | 16 |
| 12 | 2 |

The addition of methanol results in economic and technological disadvantages. Actually large quantities of methanol must be used to confer good stability to the solution and this is obviously a disadvantage. Furthermore when used in small quantities, it slackens remarkably the kinetics of condensation reactions.

For these reasons, many studies have been carried out on the use of other stabilizers, such as urea, melamine, and phenol, which can be used in lower proportions with respect to methanol, and which render the aqueous formaldehyde solutions preservable even at low temperatures.

Urea, melamine and phenol eliminate in part the inconvenience of methanol, but must nevertheless be used in amounts which interfere with a general (i.e. wide or universal) utilization of such stabilized formaldehyde solutions. In fact, each stabilizer, limits the use of the formaldehyde solution containing it to the production of only one specific type of resin.

On the other hand the heating of the solution of unstabilized formaldehyde in order to avoid the separation of polymers results in an economical disadvantage and accelerates the undesired formation of formic acid.

We have now investigated the feasibility of obtaining aqueous formaldehyde solutions which are stabilized against the precipitation of polymeric products and which can be applied to many and varied uses, without the above limitations.

The present invention thus relates to the use of amino-1,3,5-triazine derivatives, as stabilizers for commercial aqueous formaldehyde solutions, solutions stabilized therewith, and methods for preparing such solutions.

The stabilizing compounds are derivatives of amino-1,3,5-triazines of the formula

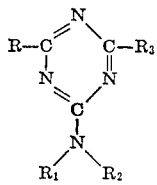

where R is chosen from the group consisting of hydrogen, alkyl, aryl, hydrogenated aryl, cyclo alkyl, aralkyl, alkylaryl, anilino or alkylanilino either N-alkyl substituted or not, and benzoguanamine radicals; $R_1$ and $R_2$ are chosen from the group consisting of hydrogen, hydroxyalkyl, alkyl, aryl, aralkyl, alkaryl, hydrogenated aryls radicals; and $R_3$ is chosen from the group consisting of hydroxyl and $NR_1R_2$ groups in which $R_1$ and $R_2$ have the aforesaid meaning; and the organic and inorganic acid addition salts thereof. R may be methyl, ethyl, propyl, butyl, pentyl, hexyl, heptyl, octyl, ethylhexyl, nonyl, decyl, undecyl, dodecyl, tridecyl, tetradecyl, pentadecyl, hexadecyl, heptadecyl, octadecyl, nonadecyl, eicosyl, benzyl, phenyl, tetrahydrophenyl-, alkyltetrahydrophenyl-, cyclohexyl, methylcyclohexyl, methyl- or ethyl or propyl-phenyl, methylanilino. $R_1$ and $R_2$ can be phenyl, methyl, ethyl, propyl, butyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, benzyl, tetrahydrophenyl, alkyl substituted tetrahydrophenyl, hydroxy-methyl, hydroxy-ethyl, hydroxy-propyl, hydroxy-butyl radicals and corresponding higher homologues.

The stability tests carried out showed the special stabilizing action of the following compounds belonging to the above general formula: benzoguanamine, N-methylol derivatives of benzoguanamine, such as mono-, di-, tri- and tetramethylol benzoguanamine, acetoguanamine, N-phenyl-2,4-diamino - 1,3,5-triazine, phenyl - acetoguanamine, tetrahydrobenzoguanamine, N-methylanilino-propioguanamine, phthalodiguanamine, benzoguanide, N,N′-dimethyl benzoguanamine, $N_1$, $N_2$ dimethylolphenylacetoguanamine, N-ethylformoguanamine, formoguanamine, N,N-dibenzylformoguanamine, N-phenylethyl formoguanamine, benzoguanamine sulfate, benzoguanamine formate.

Particularly effective as stabilizers are the alkylguanamines in which the alkyl group contains 6 to 20 carbon atoms, e.g., hexyl guanamine, heptyl guanamine, octyl guanamine, ethylhexylguanamine, nonylguanamine, decylguanamine, undecylguanamine (or laurogunamine), dodecylguanamine, tridecylguanamine, tetradecylguanamine, pentadecylguanamine, hexadecylguanamine, heptadecylguanamine, octadecylguanamine, nonadecylguanamine and eicosylguanamine.

The formaldehyde solutions treated with these stabilizers are stable and can be employed in all the usual uses for unstabilized aqueous formaldehyde solutions. The substances claimed in our invention act in this sense in a surprisingly more effective manner than the known stabilizers.

The relationship between the increase in the formaldehyde concentration, the stabilization time and the stabilizer amount, between the storage temperature and the formaldehyde concentration and between the storage time and the stabilizer concentration are illustrated in Examples 22–24.

The formaldehyde solutions, stabilized according to the present invention, can be obtained by using either formaldehyde directly coming from the synthesis plant or solutions with a low formaldehyde content concentrated in successive stages according to known techniques.

In the first case, the stabilizers can be added to the synthesis plant in the gas absorption stage or separately to the solutions obtained by the usual modalities.

In the second case, they can be added either before or after the concentration.

In general for all types of solutions, the stabilizers, in order to exert their action, must be dissolved. This can be carried out within a wide temperature range and preferably between 20° and 80° C. and for times varying depending on the type and the amount of stabilizer used even though these temperatures are not essential.

The addition of the stabilizers in the form of methylol derivatives, separately prepared in the solid form or in solution, can simplify the dissolution.

As we have said above, the pH conditions have a remarkable influence on the stability of the concentrated formaldehyde solutions.

The stabilizers according to the present invention have an effective action also within a wide range of pH values. At acid pH values between 2 and 6 however they have a higher stabilizing action.

The stabilized formaldehyde solutions obtained according to this invention can be substituted for the normal formaldehyde solution.

At the different storage temperatures, the stability of the solutions over a period of time was followed by observing the appearance of the solutions, and by controlling variations in one or more characteristics, such as viscosity, density and pH.

A solution is considered stable so long as its appearance remains clear, and it is free of precipitates.

The invention is illustrated by the following examples which are not intended to limit the scope of the invention.

In the following examples the percentages are by weight, if not clearly specified to the contrary.

EXAMPLE 1

Benzoguanamine

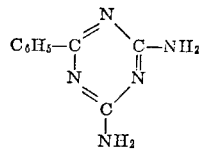

2000 grams of 36% aqueous formaldehyde solution having a pH of about 3.5 were charged into a 3-liter flask provided with an agitator, a thermometer and a reflux condenser. The solution was kept in agitation and gradually heated to 50° C.

1.6 g. of benzoguanamine crystals were then added while maintaining the above-mentioned conditions for 2 hours. The stabilized solution was then discharged and, after determination of its pH, it was placed in a thermostatic cell to determine its stability with time.

The stability of the solution is evident from the data presented in the following table:

TABLE

[36% CH₂O solution stabilized with 0.08% of benzoguanamine]

| Initial characteristics | | Characteristics after storage at −10° C. for 10 days | | |
|---|---|---|---|---|
| Appearance | pH at 20° C. | CH₂O content, percent | Appearance | pH at 20° C. | CH₂O content, percent |
| Clear | 3.7 | 35.9 | Clear | 3.7 | 35.8 |

At −10° C. the solution can be preserved for 10 days, at 0° C. for 30 days and +20° C. for more than 60 days.

The formaldehyde solution containing benzoguanamine was used in the preparation of urea-formaldehyde, melamine-formaldehyde, and phenol-formaldehyde resins, obtaining results identical with those obtained with the non-stabilized formaldehyde solution.

EXAMPLE 2

Benzoguanamine

The apparatus and the operative conditions described in Example 1 were adopted. The aqueous formaldehyde solution employed had a concentration of 43%, as taken directly from the commercial plant in which it was made. (It can also be prepared in the laboratory by concentrating a 36% aqueous solution.)

2000 g. of 43% solution with a pH of about 3.5 were heated to 70° C., while agitating. When this temperature was reached, 6.0 g. of benzoguanamine crystals were added and the conditions described above were maintained for 3 hours. The stabilized solution was then discharged and was placed in thermostatic cells, to observe its stability with time.

At −10° C. the solution is preservable for 3 days, at 0° C. for 8 days and at +20° C. for more than 60 days.

This solution was also used in the preparation of urea-, melamine- and phenol-formaldehyde resins, with positive results.

EXAMPLE 3

Benzoguanamine

The operating conditions of Example 1 were reproduced on an industrial scale, as follows:

30 tons of 36% CH₂O aqueous solution with a pH of 3.5, coming directly from the formaldehyde production plant, were placed in a 35 cubic meter tank and circulated by means of a pump. The solution was gradually heated to 50° C.

24 kg. of benzoguanamine crystals were then added, maintaining the above-described conditions for several hours.

The solution, which is stable at −10° C. for 10 days, at 0° C. for 30 days and at +20° C. for more than 60 days, was then used in the production of urea-, melamine- and phenol-formaldehyde resins without modifying the conventional technology. The products obtained presented analytical and applicative characteristics identical with those of the resins obtained from the non-stabilized 36% formaldehyde solution.

EXAMPLE 4

Benzoguanamine

The stabilization of the aqueous formaldehyde solution was carried out on a commercial scale by continuously introducing benzoguanamine directly into the formaldehyde production towers together with the amount of water used for the absorption of formaldehyde.

The proportion of benzoguanamine were those of Example 3.

The stabilized solution thus obtained is preservable within a wide temperature range, and can be used without any limitation in the preparation of urea-, melamine- and phenol-formaldehyde resins.

A sample of solution, kept at the temperature of −10° C., maintained its appearance and initial characteristics unaltered for 10 days, at 0° C. for 30 days and at +20° C. for more than 60 days.

Urea-formaldehyde, melamine-formaldehyde, and phenol-formaldehyde resins obtained by using the CH₂O solution containing benzoguanamine presented general characteristics identical with those of the products obtained from non-stabilized CH₂O.

EXAMPLE 5

Dimethylolbenzoguanamine

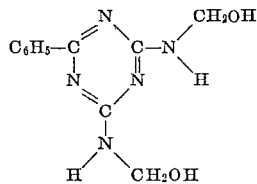

2000 grams of a 36% aqueous formaldehyde solution with a pH of about 3.4 were charged into a 3-liter flask provided with an agitator, a thermometer, and a reflux condenser, and were heated to 50° C. while agitating.

At the pre-fixed temperature, 2.65 g. of N,N'-dimethylolbenzoguanamine were added, the pre-fixed conditions being maintained for about 15 hours. The solution was then discharged and was placed in a thermostatic cell to determine its stability with time.

At the temperature of −10° C., the solution is stable for 10 days, at 0° C. for 30 days and at 20° C. for more than 60 days.

EXAMPLE 6

Tetramethylolbenzoguanamine

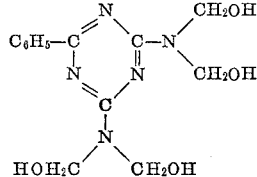

The apparatus described in Example 1 was adopted.

2000 grams of 36% aqueous formaldehyde solution with a pH of about 3.4 were heated to 70° C. while agitating; at the stated temperature, 3.30 g. of N,N'-tetramethylolbenzoguanamine were added, and the conditions maintained for about 6 hours.

The solution was then discharged and was placed in suitable cells for observation of its stability with time.

At −10° C. the solution is stable for 10 days, at 0° C. for 30 days and at +20° C. for more than 60 days.

EXAMPLE 7

Benzoguanide

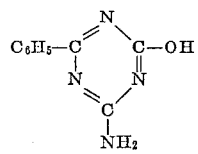

The apparatus described in Example 1 was used.

2000 grams of a 36% aqueous formaldehyde solution at a pH of about 3.4 were heated to 50° C. while agitating. At this temperature, 14 g. of benzoguanide crystals were added, the conditions being maintained for about 16 hours.

The solution was then discharged, it was placed in thermostatic cells to determine its stability.

At −10° C., the solution is stable for 6–8 days, and at 20° C. for more than 60 days.

EXAMPLE 8

N,N'-dimethylbenzoguanamine

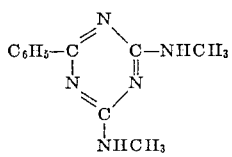

The apparatus described in Example 1 is used.

2000 grams of a 36% aqueous formaldehyde solution at a pH of about 3.4 were heated to 60° C. while agitating. At this temperature 2.30 g. of N,N'-dimethylbenzoguanamine crystals are added, the stated conditions being maintained for about 10 hours.

The solution was then discharged and it was placed in thermostatic cells for determination of its stability.

At −10° C., the solution is stable for 8–10 days, while at +20° C. it is stable for more than 60 days.

EXAMPLE 9

Benzoguanamine sulfate

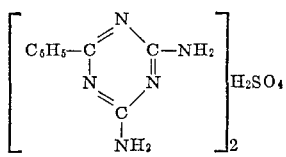

The apparatus described in Example 1 is used.

2000 g. of a 36% aqueous formaldehyde solution at a pH of 3.3 were heated to 50° C., while agitating. At said temperature, 2.50 g. of benzoguanamine sulfate crystals are added, the pre-fixed conditions being maintained for 16 hours.

The solution was then discharged and it was placed in the thermostatic cells to test its stability with time.

At −10% C. the solution is stable for 10 days, while at 0° C. it is stable for 30 days and at +20° C. for more than 60 days.

EXAMPLE 10

Acetoguanamine

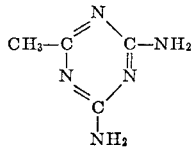

The apparatus described in Example 1 is used.

2000 g. of a 36% aqueous formaldehyde solution at a pH of about 3.3 were heated to 50° C. while agitating. At this temperature 40.0 g. of acetoguanamine crystals are added, the pre-fixed conditions being maintained for about 6 hours. The solution was then discharged and was placed in the thermostatic cells to determine its stability with time.

At −10° C., the solution is stable for 5 days, while at 0° C. it is stable for 15 days and at +20° C. for more than 60 days.

EXAMPLE 11

N-phenyl-2,4-diamino-1,3,5-triazine

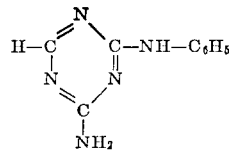

The apparatus described in Example 1 is used.

2000 g. of a 36% aqueous formaldehyde solution at a pH of about 3.4 were heated to 50° C. while agitating. At this temperature, 40.0 g of N-phenyl-2,4,-diamino-1,3,5-triazine crystals were added, the stated conditions being maintained for about 10 hours.

The solution was then discharged and it was placed in the thermostatic cells to determine its stability.

At −10° C., the solution is stable for 5–6 days, while at +20° C. it is stable for more than 60 days.

EXAMPLE 12

Phenylacetoguanamine

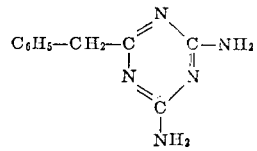

The apparatus described in Example 1 was used.

2000 g. of a 36% aqueous formaldehyde solution at a pH of about 3.2 were heated to 60° C. while agitating. At this temperature, 8.0 g. of phenylacetoguanamine crystals were added, the conditions being maintained for 1 hour. The solution was then discharged and was placed in the thermostatic cells to test its stability.

At −10° C., the solution was stable for 4 days, while at +20° C. it is stable for more than 60 days.

EXAMPLE 13

Tetrahydrobenzoguanamine

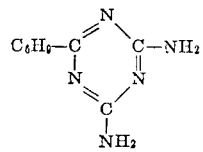

The apparatus described in Example 1 is used.

2000 grams of a 36% aqueous formaldehyde solution at a pH of about 3.2 were heated to 50° C. while agitating. At this temperature, 8.0 g. of tetrahydrobenzoguanamine were added, raising the pH to about 3.6. The above conditions were maintained for about 16 hours. The solution was then discharged and it was placed in the thermostatic cells to determine its stability.

At −10° C., the solution is stable for 8 days, while at +20° C. it is stable for more than 60 days.

EXAMPLE 14

N-methylanilino-propioguanamine

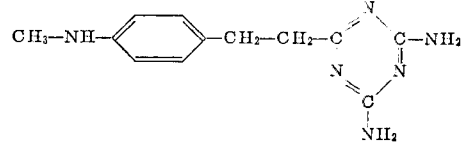

The apparatus described in Example 1 is used.

2000 g. of a 36% aqueous formaldehyde solution at a pH of about 3.3 were heated to the temperature of 80° C. while agitating. At this temperature, 4.0 g. of N-methylanilino-propioguanamine crystals were added, the conditions being maintained for 30 minutes.

The solution was then discharged and it was placed in the thermostatic cells to determine its stability.

At −10° C., the solution is stable for 6–7 days, while +20° C. it is stable for more than 60 days.

EXAMPLE 15

Phthalodiguanamine

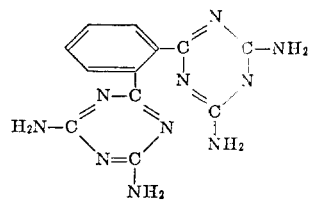

The apparatus described in Example 1 is used.

2000 g. of a 36% aqueous formaldehyde solution at a pH of about 3.4 were heated to 50° C. while agitating. At this temperature, 40.0 g. of phthalodiguanamine crystals were added, the conditions being maintained for about 10 hours. The solution was then discharged and it was placed in the thermostatic cells to determine its stability.

At −10° C., the solution is stable for 4 days, while at +20° C. it is stable for more than 60 days.

EXAMPLE 16

N,N'-dimethylolphenylacetoguanamine

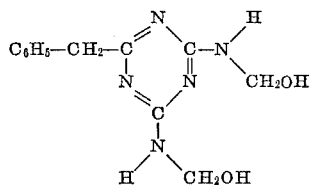

The apparatus described in Example 1 is used.

2000 grams of a 36% aqueous formaldehyde solution at a pH of about 3.3 were heated to 60° C. while agitating. At this temperature, 10.4 g. of $N_1N_2$-dimethylolphenylacetoguanamine crystals were added, and the above conditions were maintained for 1 hour.

The solution was then discharged and it was placed in the thermostatic cells to test its stability.

At −10° C., the solution is stable for 4 days, while at +20° C. it is stable for 60 days.

EXAMPLE 17

Formoguanamine

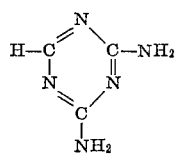

The apparatus described in Example 1 is used.

2000 g. of a 36% aqueous formaldehyde solution at a pH of about 3.3 were heated to 50° C. while agitating. At this temperature 40.0 g. of formoguanamine crystals are added, the conditions being maintained for about 6 hours. The solution was then discharged and was placed in the thermostatic cells to determine its stability.

At −10° C., the solution is stable for 10 days, while at +20° C. it is stable for more than 60 days.

EXAMPLE 18

N-ethylformoguanamine

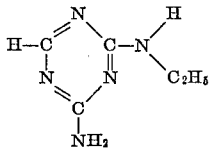

1,000 g. of a 36% aqueous formaldehyde solution at pH 3.5 after addition of 5 g. of N-ethylformoguanamine, are heated to 50–55° C. for 4 hours.

The solution is then cooled to room temperature; the pH of the solution after this treatment is between 3.5 and 4.

The solution kept at −10° C. in a cooling cell remains clear for several days and thereafter becomes slightly turbid without formation of precipitate. It is stable under these conditions for storage time up to 15 days at −10° C.

At +20° C. the solution is stable for more than 60 days.

EXAMPLE 19

N,N-dibenzylformoguanamine

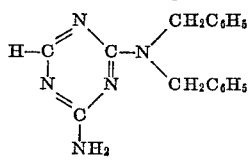

1,000 g. of a 36% aqueous formaldehyde solution at pH 3.5, after addition of 5 g. of N,N-dibenzylformoguanamine, are heated to 50–55° C. for 4 hours.

The solution is then cooled to room temperature; the pH of the solution after this treatment is between 3.5 and 4.

The solution kept at −10° C. in a cooling cell remains clear for several days and then becomes slightly turbid without any formation of precipitate for a storage time up to 15 days (−10° C.).

At +20° C. the solution is stable for more than 60 days.

EXAMPLE 20

N-phenylethylformoguanamine

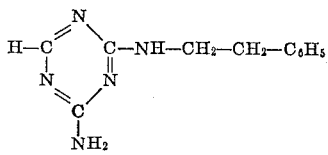

1,000 g. of a 36% aqueous formaldehyde solution at pH 3.5 after addition of 5 g. of N-phenylethylformoguanamine, are heated to 50–55° C.

The solution is then cooled to room temperature; the pH of the solution after this treatment is between 3.5 and 4.

The solution kept at −10° C. in a cooling cell remains clear for several days and then becomes slightly turbid, however, without any formation of a precipitate for a storage time up to 15 days (at −10° C.).

At +20° C. the solution is stable more than 60 days.

EXAMPLE 21

Benzoguanamine formate

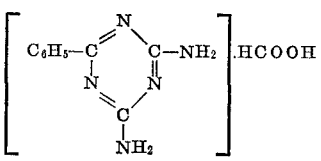

2,000 g. of a 36% aqueous formaldehyde solution at a pH of 3.3 are heated to 50° C. At this temperature, 2.5 g. of benzoguanamine formate are added and the above conditions of temperature and pH are maintained for 16 hours.

The solution is then kept in a thermostatic cell at −10° C. The solution is stable for 12 days at this temperature. At +20° C. it is stable for more than 60 days.

EXAMPLE 22

0.5, 1, 2.5, 10, 20 and 25 g., respectively of benzoguanamine

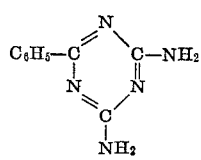

are added to 6 samples, each consisting of 1,000 g. of aqueous formaldehyde solutions having a $CH_2O$ content of 35, 40, 45, 50, 55 and 60% respectively and a methanol content ≤1%.

The solution is heated for 2 hours at 55–65° C. until the benzoguanamine is completely dissolved.

The solutions are then cooled to room temperature (16–22° C.) and are observed in order to see whether they become turbid and a precipitate is formed.

The results are reported in the following table.

| Formaldehyde, percent by weight | Benzoguanamine conc., percent by weight of the solution | Stability at 16–22° C. (days) | Appearance |
|---|---|---|---|
| 35 | 0.05 | >30 | Clear. |
| 40 | 0.10 | >30 | Do. |
| 45 | 0.25 | >30 | Do. |
| 50 | 1.00 | 15–30 | Slightly turbid. |
| 55 | 2.00 | 2–4 | Do. |
| 60 | 2.50 | Unstable | Turbid. |

EXAMPLE 23

A series of non-stabilized aqueous formaldehyde solutions having increasing concentration from 15 to 50% (and a methanol content $\leq 1\%$) is kept in thermostatic cells at increasing temperatures from $-15°$ to $35°$ C. for 15 days and are kept under control to see whether they become turbid and a precipitate is formed.

For each storage temperature the maximum formaldehyde concentration which makes it possible to maintain a clear solution for the above period of time (15 days) is thus determined.

The test is repeated by using formaldehyde solutions stabilized with 0.2–0.4% of lauroguanamine and having a formaldehyde concentration from 30 to 65% (with a methanol content $\leq 1\%$).

The stabilization is carried out as follows: 2.4 g. of lauroguanamine $$CH_3-(CH_2)_{10}-C\begin{smallmatrix}N\\||\\N\end{smallmatrix}\begin{smallmatrix}\\ \\C\\|\\NH_2\end{smallmatrix}C-NH_2$$

are added to samples of 1000 g. of solution.

The solution of heated until the stabilizer is dissolved. The solutions are then kept in the thermostatic cells at different temperature.

The results are reported in the following table:

| Storage temperature (degrees) | Maximum concentration (percent by weight) of the formaldehyde solutions which remain clear for at least 15 days | |
|---|---|---|
| | Unstabilized | Stabilized |
| −15 | <20 | 37 |
| −10 | <20 | 40 |
| 0 | 25 | 45 |
| 16 | 30 | 50 |
| 25 | 36 | 55 |
| 33 | 40 | 60 |

EXAMPLE 24

0.5, 1, 2 and 2.5 g. of lauroguanamine are added to four samples, each consisting of 1,000 g. of 50% aqueous formaldehyde solution (having a methanol content $\leq 1\%$) which are then heated to 50–60° C. for two hours.

The solutions are then kept at 16° and 33° C. observing for what time they remain clear and free of precipitates.

The results are reported in the following table:

| Stabilizer concentration | Storage time (days) at— | |
|---|---|---|
| | 16° C. | 33° C. |
| 0.05 | 1–2 | 15 |
| 0.10 | 15 | >30 |
| 0.20 | >20 | >60 |
| 0.50 | >45 | >60 |

EXAMPLE 25

5 g. of heptylguanamine having the formula $$CH_3(CH_2)_6-C\begin{smallmatrix}N\\||\\N\end{smallmatrix}\begin{smallmatrix}\\ \\C\\|\\NH_2\end{smallmatrix}C-NH_2$$

are added to 1,000 g. of a 50% formaldehyde solution, directly obtained from the synthesis plant and maintained at 50–60° C.

The solution is kept to 50–55° C. for 2 hours and thereafter the pH value is 3.

The solution is cooled to 16° C. At this temperature it remains clear for at least 7 days while at 33° C. it remains clear for more than 1 month.

EXAMPLE 26

5 g. of nonylguanamine having the formula $$CH_3(CH_2)_8-C\begin{smallmatrix}N\\||\\N\end{smallmatrix}\begin{smallmatrix}\\ \\C\\|\\NH_2\end{smallmatrix}C-NH_2$$

are added to 1,000 g. of a 56% formaldehyde solution having a methanol content $\leq 1\%$ obtained by concentrating a 36% formaldehyde solution at 50–60° C. under a pressure of 50 mm. Hg.

The solution is then heated to 55° C. for 2 hours and the pH of the solution is determined; it has a value of 3.2.

The solution is then cooled to 22° C. and at this temperature its behaviour with time is observed. It remains clear at least for seven days at this temperature and for higher times at higher temperatures (e.g., at 33° C. for more than 15 days).

EXAMPLE 27

1 g. of lauroguanamine having the formula $$CH_3(CH_2)_{10}-C\begin{smallmatrix}N\\||\\N\end{smallmatrix}\begin{smallmatrix}\\ \\C\\|\\NH_2\end{smallmatrix}C-NH_2$$

is added to 1,000 g. of a 50% formaldehyde solution having a methanol content $\leq 1\%$ obtained directly from the synthesis plant and kept at 55° C.

The mixture is heated to 55° C. for 2 hours and the pH is determined; it has a value of 3.1.

By cooling the solution to 16° C. and observing its behaviour at this temperature, it can be noted that it remains clear at least for 15 days.

At 22° C. it remains unaltered at least for 30 days.

EXAMPLE 28

10 g. of lauroguanamine are added to 1,000 g. of a 60% formaldehyde solution having a methanol content $\leq 1\%$ obtained by concentration of a 36% formaldehyde solution at 50–60° C. under a pressure of 50 mm. Hg and kept at 70° C.

The solution is heated to 70° C. for at least 4 hours and the pH is measured; it has a value of 3.

The solution is cooled and kept at 22° C. while observing its behaviour with time. At this temperature it remains clear at least for 7 days while at higher temperatures it remains clear for longer times (e.g. at 33° C. for more than 15 days).

EXAMPLE 29

20 g. of lauroguanamine are added to 1,000 g. of 68% aqueous formaldehyde solution obtained by concentration of a 36% formaldehyde solution having a methanol content ≦1% at about 60° C. under a pressure of 50 mm. Hg and kept at 80° C.

The solution is kept at 80° C. for about 2 hours and is then cooled and kept at 40° C. while observing its behaviour with time.

At this temperature the concentrated solution remains clear for at least one day, at higher temperatures it remains clear for longer times (e.g. at 55° C. for at least 15 days).

EXAMPLE 30

50 g. of lauroguanamine are added to 1,000 g. of a 75% aqueous formaldehyde solution (having a methanol content ≦1%) just prepared by concentration of a 37% formaldehyde solution at 80–90° C. under a pressure of 60 mm. Hg.

The solution is kept at 90° C. for at least one hour and is then left to cool and kept at 50° C. while observing its behaviour with time.

At this temperature the concentrated solution remains clear for at least 12 hours.

EXAMPLE 31

10 g. of lauroguanamine are added to 1,000 g. of a 37% aqueous formaldehyde solution (having a methanol content ≦1%) and the solution is heated to 50–60° C. until the stabilizer is dissolved.

The pH of the solution is 3.2. The solution thus prepared remains clear at −10° C. for at least 15 days and at 22° C. for at least 60 days.

EXAMPLE 32

1.1, 1.2 and 1.45 g. of mono-, di- and tetramethylol-lauroguanamine, respectively, are added to three 1,000 g. samples of 50% formaldehyde solution (having a methanol content ≦1%), obtained directly from the synthesis and kept at 55° C. (The chemical composition of the N-methylol-derivatives thus prepared is based on the stoichiometric ratios of the reaction between formaldehyde and lauroguanamine.)

The dissolution of the methylol-derivatives is easier than in case of lauroguanamine.

The solutions thus prepared are kept in a thermostatic cell at +16° and at +22° C. They remain clear and free of precipitates at least for 15 days and 30 days, respectively.

EXAMPLE 33

0.8 g. of benzoguanamine are added to 1,000 g. of a 28% aqueous formaldehyde solution.

The solution is then kept at 50° C. for 2 hours while agitating.

The solution is then discharged and placed in a thermostatic cell in order to determine the stability with time.

At −10° C. the solution remains free of precipitates for at least one month.

We claim:
1. An aqueous formaldehyde solution which is free of precipitate at lower temperatures for longer storage times at higher $CH_2O$ concentration, said solution containing as stabilizer an amino-1,3,5-triazine of the formula:

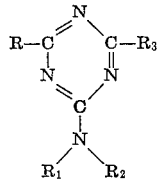

where R is chosen from the group consisting of hydrogen, alkyl, aryl, hydrogenated aryl, cyclo alkyl, aralkyl, alkylaryl, or methyl anilino, and benzoguanamine; $R_1$ and $R_2$ are chosen from the group consisting of hydrogen, hydroxyalkyl, alkyl, aryl, aralkyl, alkylaryl, and hydrogenated aryl; and $R_3$ is chosen from the group consisting of hydroxyl and $NR_1R_2$ groups in which $R_1$ and $R_2$ have the aforesaid meaning; and the formate and sulfate acid addition salts thereof.

2. A solution according to claim 1, wherein the stabilizer is an alkyl guanamine having an alkyl chain-length of 6 to 20 carbon atoms.

3. A solution according to claim 1, the stabilizer being lauroguanamine.

4. A solution according to claim 1, the stabilizer being nonylguanamine.

5. A solution according to claim 1, the stabilizer being heptyl guanamine.

6. The stabilized solution of claim 1, containing formaldehyde in the range of about 20 to 75% formaldehyde content, the said stabilizer being present in the range of 0.01 to 5.0 parts by weight per 100 parts of solution.

References Cited

UNITED STATES PATENTS 2,237,092  4/1941  Swain et al. _____ 260—606
2,714,057  7/1955  Chenicek _____ 260—606

FOREIGN PATENTS 1,336,037  7/1963  France.

LEON ZITVER, *Primary Examiner.*

R. H. LILES, *Assistant Examiner.*